June 16, 1925.  1,542,060
J. G. KING
TIRE LOCK
Filed Aug. 31, 1923
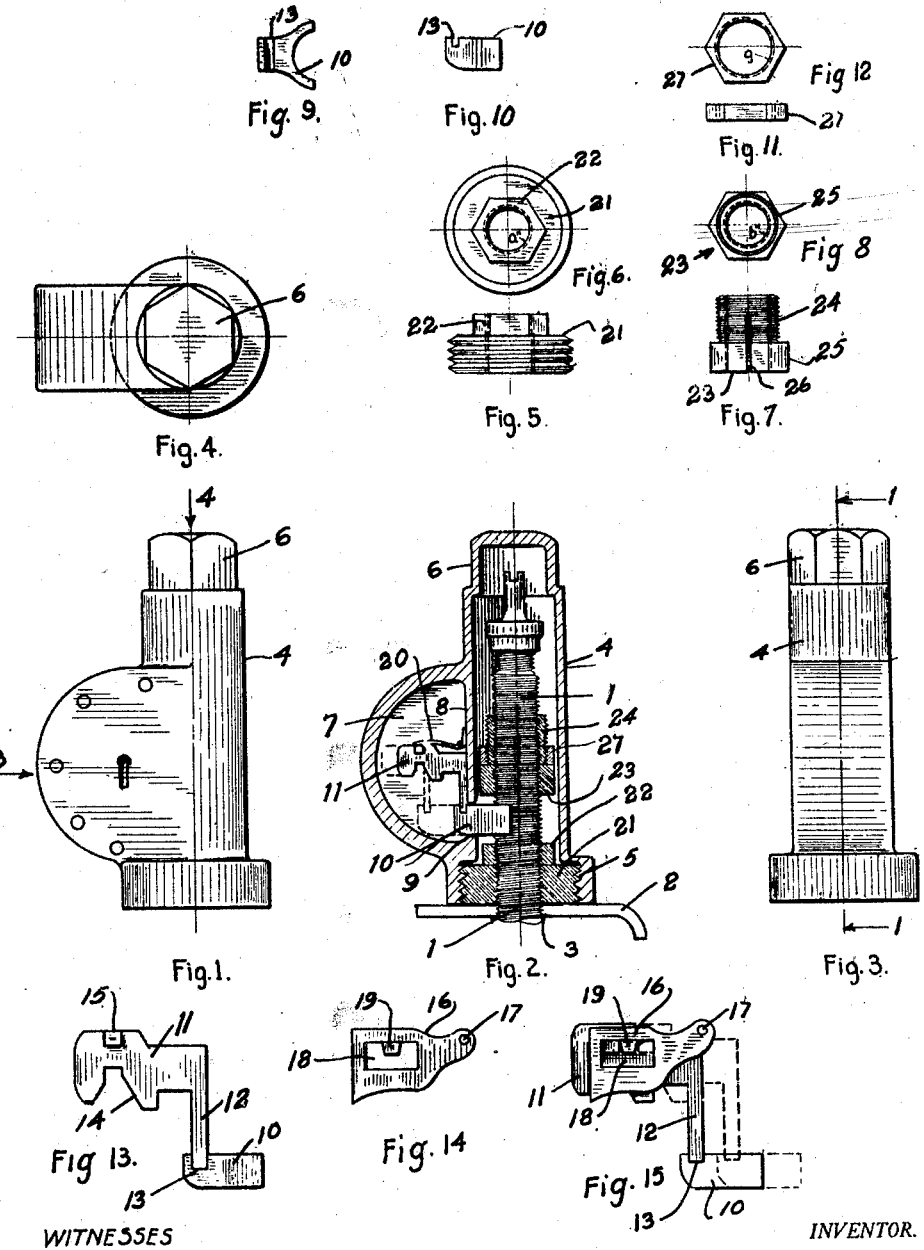
WITNESSES
Geo. E. Lundberg
J. L. Dixon
INVENTOR.
James G. King.
BY
V. J. O'Brien
ATTORNEY.

Patented June 16, 1925.

1,542,060

UNITED STATES PATENT OFFICE.

JAMES G. KING, OF EDGEWATER, COLORADO, ASSIGNOR TO J. L. BRUNS, OF DENVER, COLORADO.

TIRE LOCK.

Application filed August 31, 1923. Serial No. 660,348.

*To all whom it may concern:*

Be it known that I, JAMES G. KING, a citizen of the United States, residing at Edgewater, county of Jefferson, and State of Colorado, have invented certain new and useful Improvements in Tire Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a locking device for locking a spare automobile tire casing to the holder.

It is essential, in order to be properly safeguarded against unpleasant and annoying delays due to tire trouble, that one or more spare tires be carried, and this custom is now almost universal. It has been found from experience that spare tires which are not securely locked in place are frequently stolen. In order to carry spare tires with any degree of assurance that they will be there when needed, it is essential that they shall be locked to the car in such a manner that an unauthorized person can remove them only with great difficulty, if at all.

It is the object of this invention to provide a simple and effective means for locking a spare tire to the car, and consists briefly in inserting the valve stem through an opening in a bracket that is non-removably connected to the car body, and then applying a nut to the stem and locking the nut against rotation, whereby the tire becomes locked to the bracket by means of the stem.

In order to more clearly describe my invention, I shall have reference to the accompanying drawing, in which:

Fig. 1 is a side elevation of my improved locking device;

Fig. 2 is a longitudinal vertical section taken on line 1—1, Fig. 3;

Fig. 3 is an elevation looking in the direction of the arrow 3 in Fig. 1;

Fig. 4 is a top plan view of my locking device looking in the direction of arrow 4, in Fig. 1;

Fig. 5 is a side elevation of one of the elements of my device;

Fig. 6 is a top plan view of the part shown in Fig. 5;

Fig. 7 is a side elevation of another element of my device;

Fig. 8 is a top plan view of the part shown in Fig. 7;

Fig. 9 is a top plan view of the locking bolt;

Fig. 10 is a side elevation of the part shown in Fig. 9;

Fig. 11 is a side elevation of another element of my invention;

Fig. 12 is a top plan view of the part shown in Fig. 11;

Fig. 13 is a detail showing a portion of my lock;

Fig. 14 is a detail of one of the locking members; and

Fig. 15 is a detail showing the locking elements in assembled relation.

The same reference characters will be used to designate the same parts throughout the several views.

Numeral 1 designates the ordinary valve stem by means of which air is admitted to the inner tube. Only the outer end of this stem is shown as the construction is well known and understood.

It is customary to provide the automobiles with a bracket upon which the spare tire is carried and to which it is secured by some sort of clamping means. Since the valve stem 1 is of considerable length and projects inwardly from the demountable rim, a hole is provided in the carrying bracket for the reception of the stem. In the drawing (Fig. 2) the bracket is indicated by numeral 2 and the opening for the stem by numeral 3. After the spare tire has been applied to the bracket, my improved locking device is applied to the stem and prevents the same from being pulled out of opening 3, thereby securely locking the tire against removal.

My locking device comprises a tubular casing 4, one end of which is somewhat enlarged and internally threaded, as indicated by numeral 5, the other end being closed and formed hexagonal, as indicated by numeral 6. On one side of the casing I have provided a chamber 7 which is separated from the interior of the tubular casing by a wall 8. An opening 9 through the wall 8 provides a guide for the locking pawl or bolt 10 which may be reciprocated by means of a locking mechanism comprising a slide 11 which has a downwardly extending lug 12 which engages and cooperates with a transverse slot 13 in the bolt 10. The slide 11 has the usual notch 14 for the key and a lug 15. A tumbler 16 is pivoted at 17 and rests on the slide 11. The tumbler has a central opening 18 on the upper side of which is a projection 19. A spring 20 (Fig. 2) rests upon the edge of the tumbler 16 and tends to hold it in its locking position. The key raises the tumbler and moves the slide in the manner old and well known. The lock described may be replaced by any equivalent locking means that will operate the bolt 10. Threadedly secured to the enlarged end 5 is a nut which has a circular portion 21 threaded for engagement with the threaded interior of the casing. A hexagonal portion 22 projects from the upper surface of the nut.

The nut just described has its interior threaded to fit the threads on the exterior of the valve stem. A tubular member 23 has its interior threaded to fit the stem 1 and has one portion 24 of its outside threaded while the other portion 25 is hexagonal so as to permit it to be grasped by a wrench. A diametrical slot 26 is cut into one end of the tubular member 23. The outer threaded portion 24 is preferably slightly tapered, being somewhat greater in diameter at the bottom than at the top. A nut 27 fits on the threaded part 24 and serves to clamp the member 23 onto the stem 1.

The operation of my lock is as follows: The stem 1 is inserted in the opening 3 of the bracket 2 and the nut 21 is then screwed onto the stem and against the surface of the bracket. The tubular member 23 is then screwed onto the stem for some distance, a space being left between the tubular member 23 and the top of the hexagonal portion 22 sufficient to receive the locking pawl or bolt 10 which is adapted to engage the annular shoulder formed by the end of the tubular member 23 in the manner clearly disclosed in Fig. 2. The tubular member 23 is then clamped by means of nut 27. My locking device is then applied to the stem in the manner shown in Fig. 2 and the bolt 10 moved from dotted to full line position by means of a key. It is apparent that when my locking device is in the position shown in Fig. 2, the stem cannot be removed from the bracket as it is held in place by means of the nut 21 and that the latter cannot be rotated because it is enclosed by the casing 4 and even though the casing can be rotated to some extent, its movement is limited by the bolt 10 engaging the annular shoulder formed by the end of the tubular member 23. As long as the bolt 10 is in the locking (full line) position (Fig. 2), the stem cannot be removed from the support and as the stem connects with the inner tube, it is evident that the spare tire or casing cannot be removed without breaking the stem. When the casing is to be used, the bolt 10 is moved back into dotted line position (Fig. 2). The casing can then be rotated and removed, after which the nut 27 is unscrewed sufficiently to loosen the tubular member 23, which is then removed and this permits the nut 21 to be removed, after which the tire may be removed from the carrier or bracket.

In the above description I have shown how this lock can be used for the purpose of locking the spare tire in place on the bracket. It is obvious that my lock can also be employed for the purpose of locking the tires in place on the wheel rim. It often occurs that tires are removed from the wheel and that it is therefore as necessary to lock the same in place on the wheel as to lock the spare tire in place on the bracket.

Having now described my invention, what I claim as new is:

1. In combination, a threaded stem, a nut threadedly connected thereto, a tubular casing adapted to surround said stem and nut, said tubular casing and nut being freely movable relative to each other, and movable locking means carried by the tubular casing for engaging said nut when the tubular casing is moved in one direction, whereby the tubular casing will be held against longitudinal movement.

2. In combination, a threaded stem, a nut threadedly connected thereto, a tubular casing adapted to surround said stem and nut, said tubular member and nut being disconnected from and freely movable with respect to each other a locking bolt carried by the tubular casing, and means for moving said bolt into and out of locking position said bolt being adapted to engage the nut when the casing is moved in one direction.

3. In combination, a threaded stem, an outwardly extending shoulder on the stem intermediate the ends thereof, a tubular casing adapted to enclose said shoulder and a portion of the stem, locking means carried by the tubular casing, and means for moving said locking means into and out of engagement with said shoulder.

4. A locking device for tires, comprising, in combination, a valve stem having its outer surface threaded; a nut threadedly connected to the stem, said nut having its outside threaded; a tubular member having its interior threaded and adapted to cooperate with the threaded portion of the stem; a tubular casing having one end open and the other closed, the interior of the open end being threaded to engage the threaded surface of the nut; a bolt adapted to project into the interior of the casing; and a locking mechanism for reciprocating said bolt said bolt being adapted to engage the nut when the casing is moved in one direction.

5. A tire locking device comprising, in combination, a valve stem having an outwardly extending shoulder, a casing adapted to surround said stem, a lock carried by said casing, said lock having a movable bolt, and means for moving said bolt towards said stem or away therefrom, said bolt when in the first mentioned position, being adapted to engage said shoulder when the casing is locked against longitudinal movement on the stem.

6. A tire locking device, comprising, in combination, a valve stem; a nut threadedly connected thereto; a tubular member threadedly connected to the stem; means for clamping said tubular member to said stem, one end of said tubular member being spaced from the nut so as to form an annular space; a tubular casing adapted to surround the stem, said casing carrying a locking member adapted to engage one end of the tubular member; and means for operating the locking member.

7. A tire locking device, comprising, in combination, a valve stem having its outer surface threaded; a nut threadedly connected to the stem, said nut having a portion of its outer surface threaded; a tubular member threadedly connected to the stem, one end of said member being slotted, a portion of the outer surface of said tubular member being threaded for a portion of its length, said threaded portion having a slight taper; a nut on said threaded portion, said nut serving as a means for clamping the tubular member in place; a tubular casing adapted to be threadedly connected to the threaded surface of the nut; and a locking bolt carried by the casing, said bolt being adapted to engage the end of the tubular member.

In testimony whereof I affix my signature.

JAMES G. KING.